Patented Jan. 30, 1945

2,368,335

UNITED STATES PATENT OFFICE 2,368,335

SUBSTITUTED BARBITURIC ACID DERIVATIVES AND SALTS THEREOF, AND PROCESS OF PRODUCING THE SAME

Lewis A. Walter and Louis H. Goodson, East Orange, N. J., assignors to The Maltbie Chemical Company, Newark, N. J., a corporation of New Jersey No Drawing. Application May 14, 1942, Serial No. 443,020

28 Claims. (Cl. 260—257)

The present invention relates to certain new and useful 5,5 disubstituted barbituric acid derivatives, and their salts, having useful hypnotic or sedative properties, and having the formula:

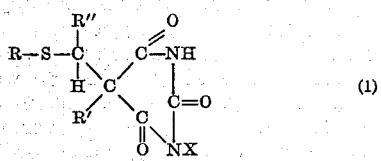

wherein R and R' are hydrocarbon groups, either saturated or unsaturated, and either the same or different; R'' is a saturated hydrocarbon group; R, R', and R'' each contain not more than six carbon atoms; and wherein the sum of the carbon atoms in R, R' and R'' does not exceed ten; R has a carbon atom attached directly to the sulfur of the thiocarbinyl group

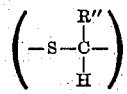

and R' has a carbon atom attached directly to the carbon atom of the barbituric acid nucleus; and wherein X is a member of a group consisting of hydrogen, alkali-metal, an equivalent of alkaline-earth metal, ammonium, mono-alkyl ammonium, dialkylammonium, alkanol ammonium and an equivalent of alkylene diammonium.

These novel compounds, and their salts, which form the subject-matter of the present invention, when tested pharmacologically, have been found to possess useful hypnotic or sedative properties, making them valuable for various medical purposes. They are, in general, white crystalline solids.

Our novel barbituric acid derivatives may be prepared by condensing the corresponding disubstituted malonic ester (such as may be prepared, for example, in accordance with United States Letters Patent No. 2,354,234, patented July 25, 1944) with urea by means of sodium ethylate, in an organic solvent such as absolute alcohol, and in a manner illustrated by the following equation:

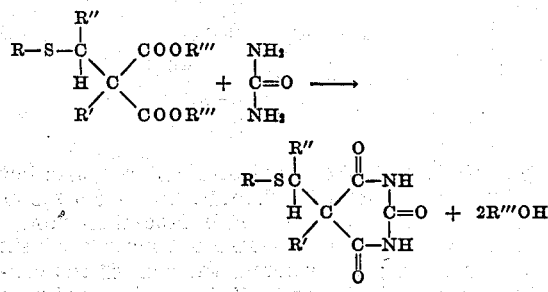

(wherein R''' is a lower alkyl group).

Salts of the compounds may be be prepared as hereafter described.

The following specific examples are illustrative of the novel compounds according to our invention, and of suitable methods for their preparation:

In the following specific illustrative examples the term "malonic ester" refers, unless otherwise indicated, to the diethyl ester of malonic acid:

EXAMPLE 1

5-n-butylthioethylidene-5-ethyl barbituric acid

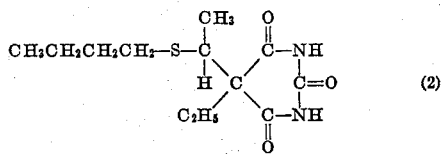

Seventy-six grams n-butylthioethylidene ethyl malonic ester and 18 grams urea are added to a solution of 12.6 grams of sodium in about 250 cc. absolute alcohol. After refluxing for fourteen hours, the alcohol is removed in a vacuum and the residue dissolved in water and extracted with ether. The aqueous layer is acidified with acetic acid and the precipitated 5-n-butylthioethylidene-5-ethyl barbituric acid is filtered off and crystallized from alcohol. It melts at approximately 138–139.5° C.

EXAMPLE 2

5-n-butylthioethylidene-5-allyl barbituric acid

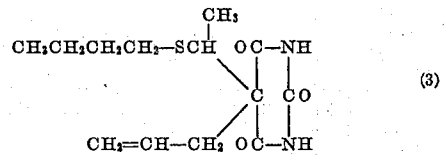

Following the same procedure as in Example 1, 80 grams of n-butylthioethylidene allyl malonic ester is condensed in absolute alcohol with 17 grams of urea and 14 grams of sodium in the form of sodium ethylate. The desired barbituric acid compound is purified by crystallization from alcohol and melts at approximately 118–119.5° C.

EXAMPLE 3

5-ethylthioisobutylidene-5-ethyl barbituric acid

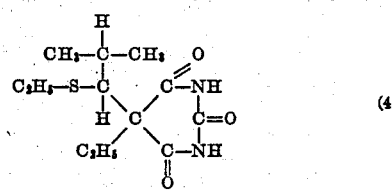

This compound is prepared from ethylthioisobutylidene ethyl malonic ester and urea in the same manner as given in Example 1, and when recrystallized from alcohol, it melts at 144.5–145.5° C.

EXAMPLE 4

*5-allylthioethylidene-5-isobutyl barbituric acid*

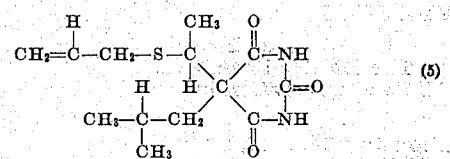 (5)

This compound is prepared from allylthioethylidene isobutyl malonic ester and urea in the same manner as given in Example 1, and when recrystallized from alcohol, it melts at 155–157° C.

In the preparation of the novel barbituric acid derivatives according to our invention, the substituent groups, R, R' and R'', as described and defined above, may be varied considerably within those limits, while producing good results and useful and valuable compounds; and among the derivatives specifically included in the invention are the following illustrative examples of our novel derivatives, all of which we have prepared and tested pharmacologically:

Barbituric acid $$R-S-\underset{\underset{R'}{|}}{\overset{\overset{R''}{|}}{C}}\underset{H}{\overset{}{\diagdown}}\underset{C}{\overset{}{\diagup}}\underset{\underset{\underset{O}{\|}}{C-NH}}{\overset{\overset{\overset{O}{\|}}{C-NH}}{}}$$

wherein:

| R is— | R' is— | R'' is— | Approximate melting point °C. |
|---|---|---|---|
| Methyl | n-Propyl | Methyl | 137–138 |
| Ethyl | Ethyl | n-Propyl | 115–117 |
| Do | do | Isopropyl | 144.5–145.5 |
| Do | do | 3-pentyl | 180.5–181 |
| Do | n-Hexyl | Methyl | 91–93 |
| Isopropyl | n-Propyl | do | 172–173 |
| Allyl | Isobutyl | do | 155–157 |
| n-Butyl | Ethyl | do | 138–139.5 |
| Do | do | Ethyl | 134–135 |
| Do | n-Propyl | Methyl | 102–104 |
| Do | Isopropyl | do | 113–114 |
| Do | Allyl | do | 118–119.5 |
| n-Amyl | Ethyl | do | 127–129 |
| Isoamyl | do | do | 130–131 |
| Cyclohexyl | Methyl | do | 176–176.5 |

In the foregoing examples the melting points are approximate and uncorrected; but are those which we actually observed, according to a procedure believed to be reliable.

While we have not prepared all compounds falling within the class defined and claimed herein, those described and named are believed to be fairly illustrative of the class. It is to be noted, however, that the compounds which we describe and claim herein are only compounds (and their salts) which have useful hypnotic or sedative properties. The present invention is limited to such compounds, and we do not claim herein the compound 5-isopropylthio-n-propylidine-5-ethyl barbituric acid, which is not included in the foregoing list, but which has the formula given under "Barbituric acid" at the head of the list, wherein R is isopropyl, R' is ethyl and R'' is ethyl, and the melting point is approximately 170–172° C. That compound is different from all those claimed herein, in that it has the peculiar and, so far as we know, unique property, among compounds of this general class, of causing spasms or convulsions, often resulting in violent death, if administered intravenously, even in small doses. Neither it, nor any other compound having similar characteristics or properties, is within our present invention or the claims hereof.

Salts of the Novel Barbituric Acid Derivatives

The sodium salts of the barbituric acids described above may be prepared by dissolving 1 mole of the appropriate disubstituted barbituric acid in the minimum quantity of hot absolute alcohol and adding a solution containing one equivalent of sodium in absolute alcohol. On cooling, or on evaporation of the alcohol, the sodium salt separates as crystals, or in amorphous form. In some instances, a syrup results and this material, when stirred with dry ether, gives the sodium salt in powder form.

Other alkali-metal salts may also be prepared by similar procedure using the appropriate metal.

The sodium salts of our novel barbituric acid derivatives according to our invention have been found to be readily soluble in water, and their aqueous solutions are alkaline in reaction. When administered orally or hypodermically they are good and useful hypnotics or sedatives, and range in duration of action from long to ultra-short acting.

Calcium salts of our novel compounds may be prepared by treating an absolute alcohol solution of the corresponding sodium salt with the metathetical amount of alcoholic calcium chloride, filtering off the precipitated sodium chloride and concentrating the alcoholic solution to yield the calcium salt.

The ammonium, alkyl and alkanol ammonium salts of our novel compounds may be prepared by dissolving the corresponding barbituric acid in an excess of ammonia or amine and subsequently removing the excess quantity of base.

In the following claims it is to be understood that the expression: "barbituric acid derivatives," or similar expression, includes, also, the salts of such derivatives, such as, for example, the salts of our novel compounds as described above.

The examples given above, and illustrative processes for their production, include the best embodiments of our present invention now known to us; but it is to be understood that the invention is not necessarily or specifically limited thereto and may, under proper conditions, have other embodiments, produced in other ways, without departure from the spirit of the invention, and within the scope of the following claims.

What we claim is:

1. A new composition of matter useful in therapeutics, comprising a 5,5-disubstituted barbituric acid derivative having, physiologically, the property of producing a hypnotic or sedative action, and having the formula:

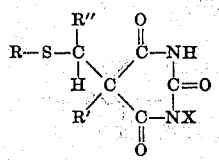

wherein R and R' are hydrocarbon groups, either saturated or unsaturated, and either the same or different; R'' is a saturated hydrocarbon group; R, R', and R'' each contain not more than six carbon atoms; and wherein the sum of the carbon atoms in R, R' and R'' does not exceed ten;

R has a carbon atom attached directly to the sulfur of the thiocarbinyl group

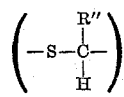

and R' has a carbon atom attached directly to the carbon atom of the barbituric acid nucleus; and wherein X is a member of a group consisting of hydrogen, alkali-metal, an equivalent of alkaline-earth metal, ammoinum, mono-alkyl ammonium, dialkylammonium, alkanol ammonium and an equivalent of alkylene diammonium, and wherein ethyl is excluded as R'' when R is isopropyl and R' is ethyl.

2. A barbituric compound according to claim 1 in which X represents hydrogen.

3. A barbituric compound according to claim 1 wherein R, R' and R'' are primary hydrocarbon groups.

4. A barbituric compound according to claim 1 wherein R, R' and R'' are primary hydrocarbon groups and X represents hydrogen.

5. A barbituric compound according to claim 1 wherein R and R' are primary saturated hydrocarbon groups.

6. A barbituric compound according to claim 1 wherein R and R' are primary saturated hydrocarbon groups and X represents hydrogen.

7. A barbituric compound according to claim 1 wherein R, R' and R'' are primary saturated hydrocarbon groups.

8. A barbituric compound according to claim 1 wherein R, R' and R'' are primary saturated hydrocarbon groups and X represents hydrogen.

9. A barbituric compound according to claim 1 wherein R and R' are primary saturated hydrocarbon groups and R'' is a methyl group.

10. A barbituric compound according to claim 1 wherein R and R' are primary saturated hydrocarbon groups, R'' is a methyl group and X represents hydrogen.

11. A barbituric compound according to claim 1 wherein R is a primary saturated hydrocarbon group, R' is an ethyl group and R'' is a methyl group.

12. A barbituric compound according to claim 1 wherein R is a primary saturated hydrocarbon group, R' is an ethyl group, R'' is a methyl group and X represents hydrogen.

13. A barbituric compound according to claim 1 wherein R is a primary saturated hydrocarbon group containing 5 carbon atoms, R' is an ethyl group and R'' is a methyl group.

14. A barbituric compound according to claim 1 wherein R is a primary saturated hydrocarbon group containing 5 carbon atoms, R' is an ethyl group, R'' is a methyl group and X represents hydrogen.

15. A barbituric compound according to claim 1 wherein R and R' are primary hydrocarbon groups and R'' is a secondary hydrocarbon group.

16. A barbituric compound according to claim 1 wherein R and R' are primary hydrocarbon groups, R'' is a secondary hydrocarbon group and X represents hydrogen.

17. A barbituric compound according to claim 1 wherein R and R' are primary saturated hydrocarbon groups and R'' is a secondary hydrocarbon group.

18. A barbituric compound according to claim 1 wherein R and R' are primary saturated hydrocarbon groups, R'' is a secondary hydrocarbon group and X represents hydrogen.

19. A barbituric compound according to claim 1 wherein R and R' are primary saturated hydrocarbon groups and R'' is an isopropyl group.

20. A barbituric compound according to claim 1 wherein R and R' are primary saturated hydrocarbon groups, R'' is an isopropyl group and X represents hydrogen.

21. A barbituric compound according to claim 1 wherein R is a secondary hydrocarbon group; R' and R'' are primary hydrocarbon groups.

22. A barbituric compound according to claim 1 wherein R is a secondary hydrocarbon group, R' and R'' are primary hydrocarbon groups and X represents hydrogen.

23. A barbituric compound according to claim 1 wherein R is a secondary hydrocarbon group, R' is a primary hydrocarbon group and R'' is a methyl group.

24. A barbituric compound according to claim 1 wherein R is a secondary hydrocarbon group, R' is a primary hydrocarbon group, R'' is a methyl group and X represents hydrogen.

25. A new composition of matter useful in therapeutics, comprising 5-isopropylthioethylidene-5-n-propyl barbituric acid having the formula:

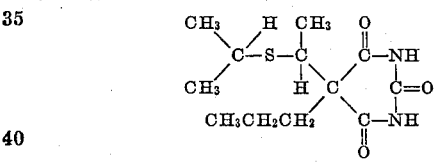

26. A new composition of matter useful in therapeutics, comprising 5-ethylthioisobutylidene-5-ethyl barbituric acid having the formula:

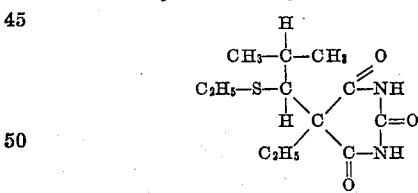

27. The process of producing a 5,5 disubstituted barbituric acid derivative according to claim 1, which comprises condensing the corresponding 5,5 disubstituted malonic ester with urea in the presence of a sodium alcoholate.

28. A new composition of matter useful in therapeutics, comprising 5-n-amylthioethylidene-5-ethyl barbituric acid having the formula

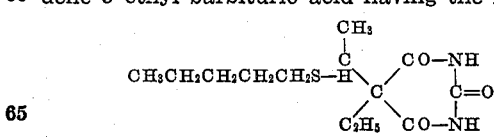

LEWIS A. WALTER.
LOUIS H. GOODSON.